United States Patent
Vamanan (10) Patent No.: US 9,930,588 B2
(45) Date of Patent: Mar. 27, 2018

(54) COMMUNICATION TERMINAL AND METHOD FOR CONTROLLING A CELL RESELECTION

(71) Applicant: Intel IP Corporation, Santa Clara, CA (US)

(72) Inventor: Sudeep Manithara Vamanan, Nuremberg (DE)

(73) Assignee: INTEL IP CORPORATION, Santa Clara, CA (US)

(*) Notice: Subject to any disclaimer, the term of this patent is extended or adjusted under 35 U.S.C. 154(b) by 401 days.

(21) Appl. No.: 14/459,379

(22) Filed: Aug. 14, 2014

(65) Prior Publication Data

US 2016/0050597 A1    Feb. 18, 2016

(51) Int. Cl.
| | |
|---|---|
| *H04W 36/00* | (2009.01) |
| *H04W 36/04* | (2009.01) |
| *H04W 36/16* | (2009.01) |
| *H04W 72/04* | (2009.01) |
| *H04W 48/16* | (2009.01) |

(52) U.S. Cl.
CPC ....... *H04W 36/04* (2013.01); *H04W 36/0083* (2013.01); *H04W 36/165* (2013.01); *H04W 48/16* (2013.01); *H04W 72/0453* (2013.01)

(58) Field of Classification Search
CPC .................................................. H04W 36/04
See application file for complete search history.

(56) References Cited

U.S. PATENT DOCUMENTS

| | | | |
|---|---|---|---|
| 2004/0058679 A1 | 3/2004 | Dillinger et al. | |
| 2008/0108353 A1* | 5/2008 | Lee | H04W 36/0061 455/437 |
| 2010/0075670 A1 | 3/2010 | Wu | |
| 2010/0136969 A1* | 6/2010 | Nader | H04W 48/18 455/434 |
| 2010/0317356 A1* | 12/2010 | Roessel | H04W 72/0406 455/450 |
| 2013/0053103 A1* | 2/2013 | Kim | H04L 5/003 455/561 |
| 2013/0078989 A1* | 3/2013 | Kubota | H04W 48/12 455/422.1 |
| 2014/0148156 A1 | 5/2014 | Kubota et al. | |

(Continued)

FOREIGN PATENT DOCUMENTS

| | | |
|---|---|---|
| DE | 10036141 A1 | 2/2002 |
| DE | 202009018405 U1 | 1/2012 |

(Continued)

OTHER PUBLICATIONS

Ericsson, "MFBI support in GERAN", 3GPP TSG GERAN#61, Tdoc GP-140160, Feb. 2014, 3 pages.

(Continued)

*Primary Examiner* — Justin Lee
(74) *Attorney, Agent, or Firm* — Viering, Jentschura & Partner mbB (57) ABSTRACT

A communication terminal is described comprising a memory storing, for each radio cell of a plurality of radio cells, an information specifying whether the radio cell supports simultaneous operation in a plurality of different and overlapping frequency bands and a controller configured to initiate a cell reselection to one of the plurality of radio cells based on at least a part of the information.

20 Claims, 4 Drawing Sheets

(56) References Cited

U.S. PATENT DOCUMENTS

2014/0171070 A1    6/2014  Tsai et al.
2016/0073310 A1*   3/2016  Hapsari ............... H04W 36/08
                                                        455/437

FOREIGN PATENT DOCUMENTS

EP      1919246 B1      1/2015
TW      201431394 A     8/2014

OTHER PUBLICATIONS

3rd Generation Partnership Project; Technical Specification Group Radio Access Network; Evolved Universal Terrestrial Radio Access (E-UTRA), Requirements on User Equipments (UEs) Supporting a release-independent frequency band (Release 11); 3GPP TS 36.307 V11.8.0, Jul. 2014, 53 pages.

Huawei, "Reply LS on inter-RAT capability signalling for MFBI", 3GPP TSG GERAN, GP-140202, Feb. 2014, 1 page.

3rd Generation Partnership Project; Technical Specification Group Radio Access Network; Evolved Universal Terrestrial Radio Access (E-UTRA); Radio Resource Control (RRC); Protocol specification (Release 12); 3GPP TS 36.331, V12.2.0, Jun. 2014, 365 pages.

3rd Generation Partnership Project; Technical Specification Group Radio Access Network; Radio Resource Control (RRC); Protocol specification (Release 12); 3GPP TS 25.331 V12.2.0, Jun. 2014, 2140 pages.

3rd Generation Partnership Project; Technical Specification Group GSM/EDGE Radio Access Network; Radio subsystem link control (Release 12), 3GPP TS 45.008, V12.3.0, Feb. 2014, 153 pages.

Huawei Technologies, "3GPP TSG GERAN WG2#61", Chairman's Summary (GP-140238), Feb. 2014, 22 pages.

* cited by examiner

COMMUNICATION TERMINAL AND METHOD FOR CONTROLLING A CELL RESELECTION

TECHNICAL FIELD

Embodiments described herein generally relate to communication terminals and methods for controlling a cell reselection.

BACKGROUND

Mobile terminals typically achieve their mobility by transitioning between different cells of cellular communication networks, usually referred to as cell reselection. This may also happen between cells of different RATs (radio access technologies). For example, a mobile terminal may transition from a GERAN (GSM EDGE Radio Access Network) cell to an LTE (Long Term Evolution) cell. In such a scenario, the case may arise that the mobile terminal gets no knowledge from the source network (the GERAN network in this example) about whether a certain feature is supported by a candidate cell of the target network (the LTE network in this example). It is desirable to avoid negative effects like an unsuccessful reselection (resulting in a waste of power) due to the lack of support of a certain feature in the candidate target cell in such scenarios.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
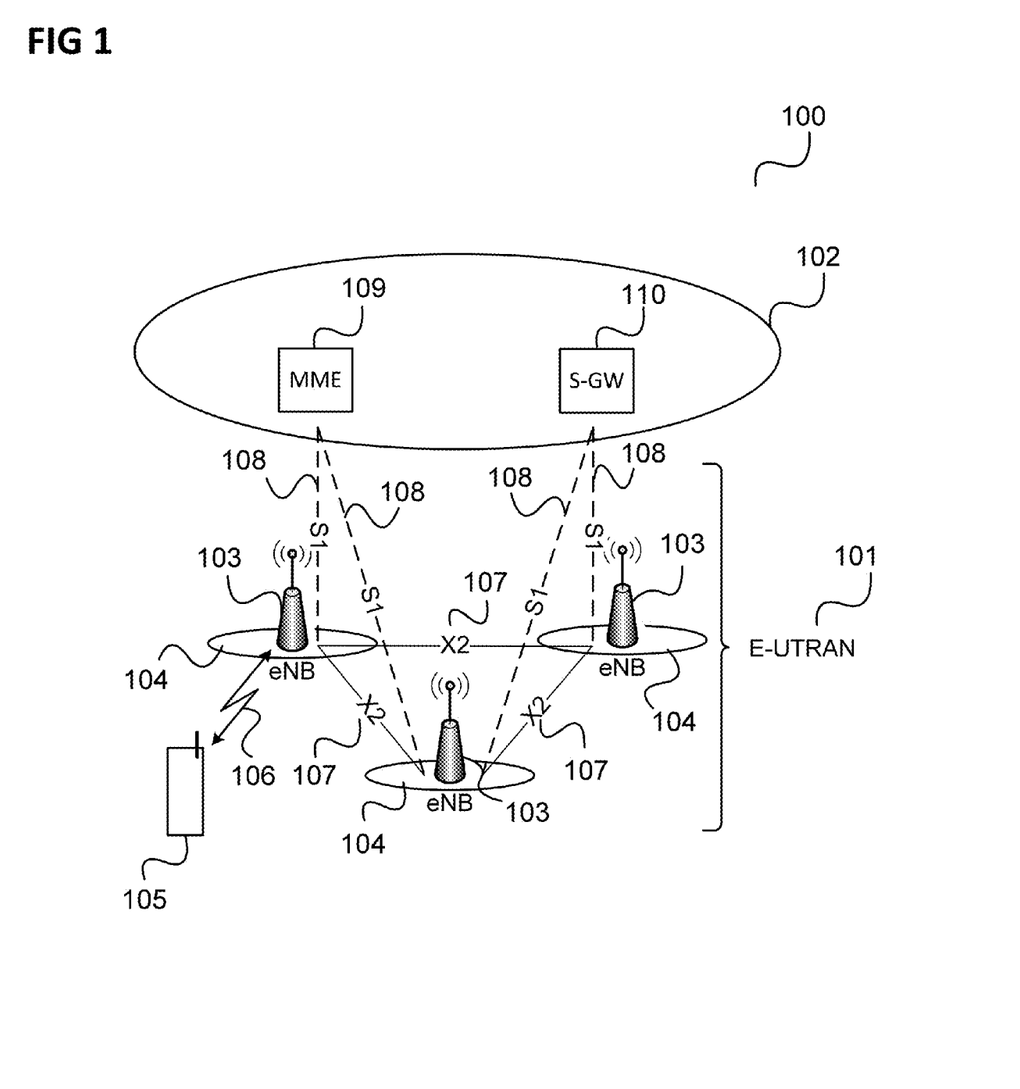
FIG. 1 shows a communication system according to a mobile communication standard, such as LTE.

FIG. 1 shows a communication system 100.

The communication system 100 may be a cellular mobile communication system (also referred to as cellular radio communication network in the following) including a radio access network (e.g. an UTRAN (UMTS (Universal Mobile Communications System) Terrestrial Radio Access Network) according to UMTS, or an E-UTRAN (Evolved UMTS Terrestrial Radio Access Network) according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications) etc.

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Also in case the mobile terminal does not have an active connection, but is in idle mode, the mobile terminal may change its serving cell (or, in other words, the cell it camps on, i.e. is registered with or is attached to). In the following, the process of changing the mobile's serving cell (either in idle mode or while actively transmitting data), i.e. transitioning from one cell as serving cell to another cell as serving cell, is referred to as cell reselection.

Release 10 and Release 8 of the 3GPP standard have introduced Multiple Frequency Band Indicator (MFBI) for UTRAN and E-UTRAN, respectively. An MFBI cell supports a physical frequency that belongs to more than one overlapping bands, e.g., Band 12 and Band 17 in E-UTRAN. A physical frequency of 734 Mhz can be referred to by EARFCN (i.e. LTE carrier channel number) 5060 of Band 12 and also as EARFCN 5730 of Band 17. A radio cell operating in this frequency may indicate its operating band as frequency band 17 in legacy signaling. Further, it broadcasts a list of additional bands in addition to this (Band 12 in this case). Together, a prioritized list of bands that the cell supports is given. A UE supporting MFBI understands EARFCN or UARFCN (i.e. UMTS channel number) encoding for non-supported bands, considers the additional bands signaled and if required performs mapping of the EARFCN (or UARFCN) to a band it supports. In idle mode the UE understands the prioritized list of bands supported by the cell and selects the first one it supports (i.e. it considers the cell to belong to that band and refers to it using the EARFCN (or UARFCN) of the band). In RRC connected mode, the E-UTRAN (or UTRAN) performs the band selection based on the UE capability and communicates to the UE after mapping the EARFCN (or UARFCN) value to the one from the chosen band.

The 3GPP TSG GERAN (Technical Specification Group GSM EDGE Radio Access Network) has agreed to introduce the signaling to communicate the multiple bands of an Inter-RAT neighbor in RRC messages in connected mode. However, it made the working assumption that there will be no introduction of air interface signaling for communicating MFBI information for UTRAN and E-UTRAN neighbor cells in idle mode. Due to this, in idle mode, a UE may not be aware whether an inter-RAT neighbor cell (e.g. an LTE cell) is supporting MFBI or not. The UE is only aware of the band indicated by the EARFCN (or UARFCN) used to refer to it in system information messages. The TSG GERAN assumption is that in idle mode, a UE centric approach with no network assistance is sufficient to perform inter-RAT mobility. However, a UE implementation which is only just compliant to the 3GPP reselection rules may suffer from drawbacks of failed reselections or wasted power consumption due to measuring non-suitable IRAT (inter-RAT) neighbors. In the absence of reliable MFBI information, a UE may (i) assume no MFBI support on Inter-RAT neighbors or (ii) assume an inter-RAT neighbor to be supporting MFBI. Approach (i) may miss out on potential suitable candidates for mobility while the approach (ii) may lead to unnecessary measurements and failed reselections. The communication terminal may also actively read System Information Blocks (SIBs) from target inter-RAT neighbors before performing a reselection. However, this comes at the cost of additional power consumption required to acquire this information.

In the following, more efficient approaches are given which may allow avoiding the missing of suitable candidates and failed reselections.

Figure 2:
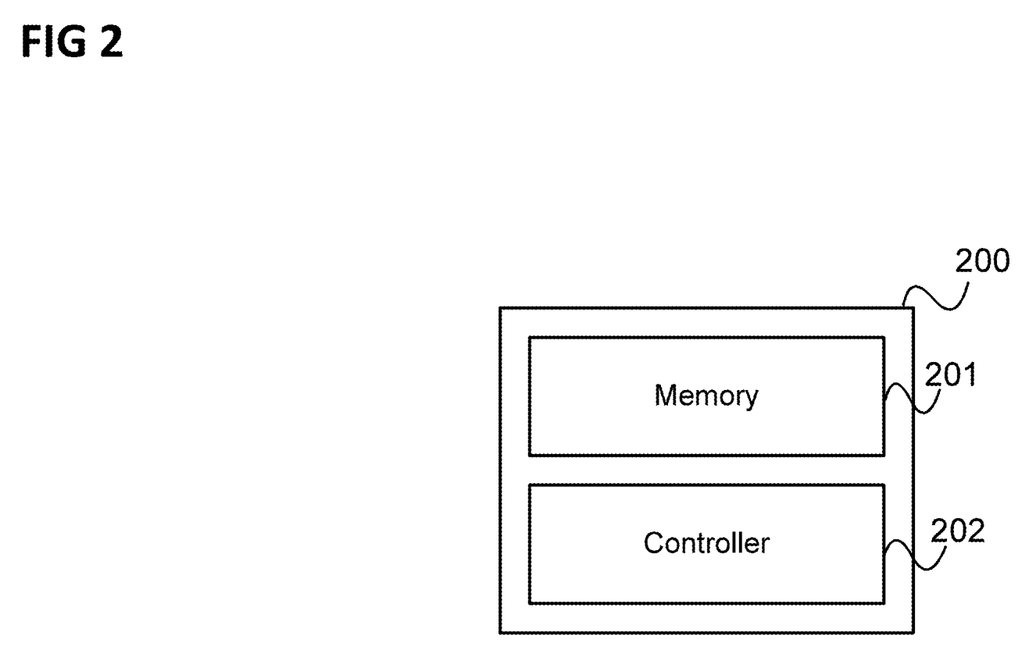
FIG. 2 shows a communication terminal.

FIG. 2 shows a communication terminal 200.

The communication terminal 200 includes a memory 201 storing, for each radio cell of a plurality of radio cells, an information specifying whether the radio cell supports simultaneous operation in a plurality of different and overlapping frequency bands.

The communication terminal 200 further includes a controller 202 configured to initiate a cell reselection to one of the plurality of radio cells based on at least a part of the information (and, e.g. based at least in part on the stored information).

In other words, a communication terminal stores the information about whether a radio cell supports simultaneous operation in a plurality of different and overlapping frequency bands, e.g. MFBI in case of an UTRAN or E-UTRAN cell. For example, the information may specify whether the radio cell supports simultaneous operation in a plurality of different and overlapping frequency bands. "Overlapping" may be understood as "at least partially overlapping", i.e. having (at least) a common region. The communication terminal consults this information when considering a reselection to a radio cell to identify cells that are suitable for a cell reselection. It may initiate or not initiate a reselection to the radio cell depending on the stored information.

For example, the communication terminal may build up the memory content by means of a "learn-as-you-go" approach where the communication terminal documents each attempted transition (successful or unsuccessful) and builds a database of information in the memory specifying whether radio cells supports simultaneous operation in a plurality of different and overlapping frequency bands or not. However, this requires the communication terminal to perform at least one attempted transition to a radio cell before information can be added to the database for the radio cell.

Instead, according to one example, the memory of a UE contains a two-dimensional network mapping database updated at every Inter-RAT reselection by the UE to and from a GERAN radio cell. At a reselection from a UTRAN or E-UTRAN (source) cell to a GERAN (target) cell, the UE stores the multiband information for inter-frequency neighboring cells and inter-RAT neighboring cells obtained from the source cell's System Information Blocks (SIB) tagged with the target cell's Cell Global Identity (CGI, e.g. comprising PLMN (Public Land Mobile Network) ID, Location Area Code and Cell ID) which uniquely identifies a cell within an operators' network). Similarly, at a successful reselection from a GERAN (source) cell to a UTRAN or E-UTRAN (target) cell the source cell's CGI and multiband info from the target cell's SIBs are stored. The UE can use this database as a reference when evaluating reselection from a GERAN cell to a UTRAN or E-UTRAN cell. Further, building up the database in this way allows (in contrast to the "learn-as-you-go-approach" described above) preventing unwanted reselection attempts at the first occurrence. Further, in contrast to active acquisition of SIBs from Inter-RAT neighbor cells there is no additional power consumption necessary. Two radio cells to be neighboring cells can be understood as that there coverage areas are adjacent or at least partially overlapping. A radio cell or a terminal being in the vicinity of another radio cell may be understood as the radio cell or the terminal being within a predetermined distance of the other radio cell, e.g. as the radio cell or the terminal being at least partially in the coverage area of the radio cell.

The components of the communication terminal (e.g. the memory and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 3:
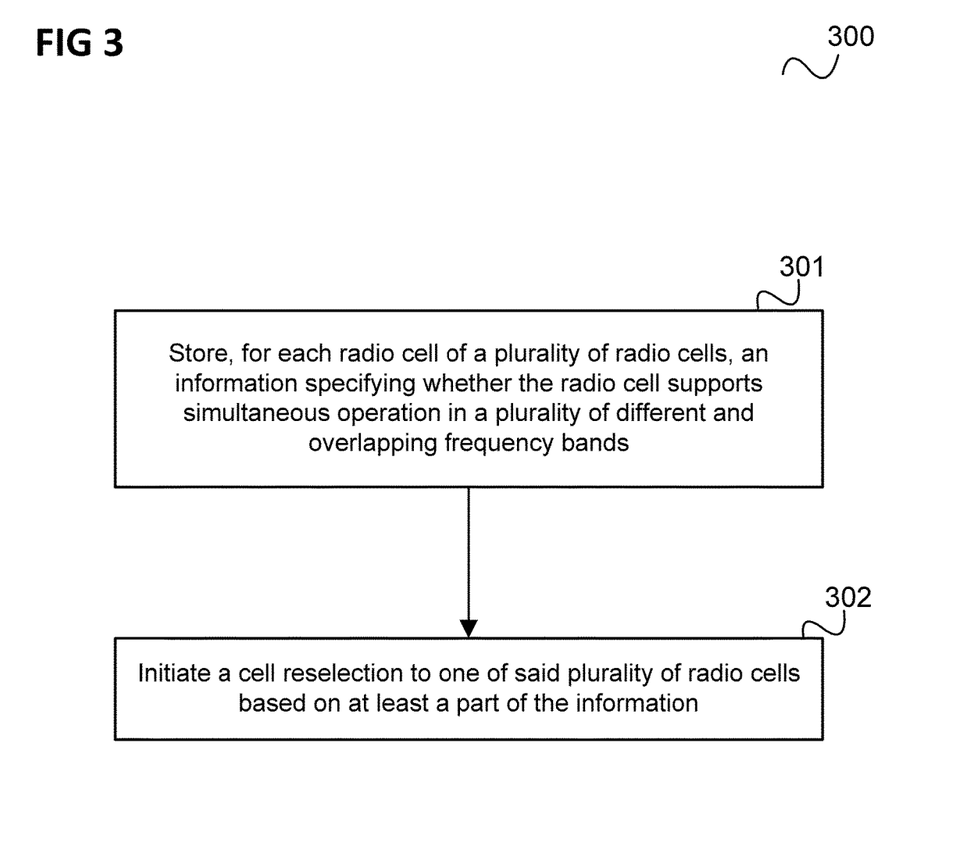
FIG. 3 shows a flow diagram illustrating a method for controlling a cell reselection.

The communication terminal for example carries out a method as illustrated in FIG. 3.

FIG. 3 shows a flow diagram 300 illustrating a method for controlling a cell reselection, e.g. carried out by a communication terminal.

In 301, the communication terminal stores, for each radio cell of a plurality of radio cells, an information specifying whether the radio cell supports simultaneous operation in a plurality of different and overlapping frequency bands.

In 302, the communication terminal initiates a cell reselection to one of the plurality of radio cells based on at least a part of the information.

The following examples pertain to further embodiments.

Example 1 is a communication terminal as illustrated in FIG. 2.

In Example 2, the subject matter of Example 1 may optionally include a determiner configured to determine, for a radio cell of the plurality of radio cells, whether the radio cell supports simultaneous operation in a plurality of different and overlapping frequency bands and to store the information in the memory.

In Example 3, the subject matter of Example 2 may optionally include the determiner being configured to determine whether the radio cell supports simultaneous operation in a plurality of different and overlapping frequency bands based on system information transmitted by the radio cell.

In Example 4, the subject matter of Example 2 may optionally include the determiner being configured to determine whether the radio cell supports simultaneous operation in a plurality of different and overlapping frequency bands based on system information transmitted by the radio cell and received by the communication terminal when the radio cell is serving the communication terminal.

In Example 5, the subject matter of Example 2 may optionally include the determiner being configured to determine whether the radio cell supports simultaneous operation in a plurality of different and overlapping frequency bands based on system information transmitted by a neighboring radio cell of the radio cell.

In Example 6, the subject matter of Example 2 may optionally include the determiner being configured to determine whether the radio cell supports simultaneous operation in a plurality of different and overlapping frequency bands based on system information transmitted by a neighboring radio cell of the radio cell and received by the communication terminal when the neighboring radio cell is a serving cell of the communication terminal.

In Example 7, the subject matter of Example 1 may optionally include the controller being configured to determine for a candidate radio cell for a cell reselection whether an information specifying whether the radio cell supports simultaneous operation in a plurality of different and overlapping frequency bands is stored in the memory, and, if the information is stored in the memory, to initiate a cell reselection to one of the plurality of radio cells based on at least a part of the information.

In Example 8, the subject matter of Example 1 may optionally include the cell reselection being a change from a current serving cell of the communication terminal to the radio cell as new serving cell of the communication terminal.

In Example 9, the subject matter of Example 1 may optionally include the plurality of radio cells belonging to a first communication network and the controller being configured to initiate a cell reselection to one of the plurality of radio cells based on at least a part of the information when the communication terminal is being served by a radio cell of a second communication network.

In Example 10, the subject matter of Example 9 may optionally include the first communication network and the second communication network operating according to different mobile radio communication standards.

In Example 11, the subject matter of Example 10 may optionally include the first communication network being an LTE communication network and the second communication network being a GERAN communication network.

In Example 12, the subject matter of Example 9 may optionally include the memory being configured to store the information for each radio cell in association with a radio cell of the second communication network.

In Example 13, the subject matter of Example 12 may optionally include the controller being configured to, when a radio cell of the second communication network is serving the communication terminal, determine for a candidate radio cell for a cell reselection which belongs to the first communication network whether an information specifying whether the radio cell supports simultaneous operation in a plurality of different and overlapping frequency bands is stored in the memory by checking the information stored in the memory in association with the radio cell of the second communication network serving the communication terminal.

In Example 14, the subject matter of Example 1 may optionally include the memory being configured to store the information for each radio cell in association with another radio cell in the vicinity of the radio cell and the controller being configured to determine for a radio cell of the plurality of radio cells whether an information specifying whether the radio cell supports simultaneous operation in a plurality of different and overlapping frequency bands is stored in the memory by checking the information stored in the memory in association with radio cells in the vicinity of the communication terminal.

In Example 15, the subject matter of Example 9 may optionally include the radio cell of the second communication network and the radio cells of the plurality of radio cells being neighboring radio cells.

In Example 16, the subject matter of Example 1 may optionally include the information specifying whether the radio cell supports simultaneous serving of mobile terminals operating in different frequency bands.

In Example 17, the subject matter of Example 1 may optionally include the information specifying whether the radio cell supports Multiple Frequency Band Indicator.

Example 18 is a method for controlling a cell reselection as illustrated in FIG. 3.

In Example 19, the subject matter of Example 18 may optionally include determining, for a radio cell of the plurality of radio cells, whether the radio cell supports simultaneous operation in a plurality of different and overlapping frequency bands and storing the information in the memory.

In Example 20, the subject matter of Example 19 may optionally include determining whether the radio cell supports simultaneous operation in a plurality of different and overlapping frequency bands based on system information transmitted by the radio cell.

In Example 21, the subject matter of Example 19 may optionally include determining whether the radio cell supports simultaneous operation in a plurality of different and overlapping frequency bands based on system information transmitted by the radio cell and received by a communication terminal when the radio cell is serving the communication terminal.

In Example 22, the subject matter of Example 19 may optionally include determining whether the radio cell supports simultaneous operation in a plurality of different and overlapping frequency bands based on system information transmitted by a neighboring radio cell of the radio cell.

In Example 23, the subject matter of Example 19 may optionally include determining whether the radio cell supports simultaneous operation in a plurality of different and overlapping frequency bands based on system information transmitted by a neighboring radio cell of the radio cell and received by a communication terminal when the neighboring radio cell is a serving cell of the communication terminal.

In Example 24, the subject matter of Example 18 may optionally include determining for a candidate radio cell for a cell reselection whether an information specifying whether the radio cell supports simultaneous operation in a plurality of different and overlapping frequency bands is stored, and, if the information is stored, to initiate a cell reselection to one of the plurality of radio cells based on at least a part of the information.

In Example 25, the subject matter of Example 18 may optionally include the cell reselection being a change from a current serving cell of a communication terminal to the radio cell as new serving cell of the communication terminal.

In Example 26, the subject matter of Example 18 may optionally include the plurality of radio cells belonging to a first communication network and initiating a cell reselection of a communication terminal to one of the plurality of radio cells based on at least a part of the information when the communication terminal is being served by a radio cell of a second communication network.

In Example 27, the subject matter of Example 26 may optionally include the first communication network and the second communication network operating according to different mobile radio communication standards.

In Example 28, the subject matter of Example 26 may optionally include the first communication network being an LTE communication network and the second communication network being a GERAN communication network.

In Example 29, the subject matter of Example 26 may optionally include storing the information for each radio cell in association with a radio cell of the second communication network.

In Example 30, the subject matter of Example 29 may optionally include determining, when a radio cell of the second communication network is serving the communication terminal, for a candidate radio cell for a cell reselection which belongs to the first communication network whether an information specifying whether the radio cell supports simultaneous operation in a plurality of different and overlapping frequency bands is stored by checking the information stored in association with the radio cell of the second communication network serving the communication terminal.

In Example 31, the subject matter of Example 18 may optionally include the information being stored for each radio cell in association with another radio cell in the vicinity of the radio cell and determining for a radio cell of the plurality of radio cells whether an information specifying whether the radio cell supports simultaneous operation in a plurality of different and overlapping frequency bands is stored by checking the information stored in association with radio cells in the vicinity of the communication terminal.

In Example 32, the subject matter of Example 26 may optionally include the radio cell of the second communication network and the radio cells of the plurality of radio cells being neighboring radio cells.

In Example 33, the subject matter of Example 18 may optionally include the information specifying whether the radio cell supports simultaneous serving of mobile terminals operating in different frequency bands.

In Example 34, the subject matter of Example 18 may optionally include the information specifying whether the radio cell supports Multiple Frequency Band Indicator.

Example 35 is a computer readable medium having recorded instructions thereon which, when executed by a processor, make the processor perform a method for controlling a data transmission according to any one of Examples claims 18 to 34.

Example 36 is a communication terminal comprising a storing means for storing, for each radio cell of a plurality of radio cells, an information specifying whether the radio cell supports simultaneous operation in a plurality of different and overlapping frequency bands and a controlling means for initiating a cell reselection to one of the plurality of radio cells based on at least a part of the information.

In Example 37, the subject matter of Example 36 may optionally include a determining means for determining, for a radio cell of the plurality of radio cells, whether the radio cell supports simultaneous operation in a plurality of different and overlapping frequency bands and for storing the information in the storing means.

In Example 38, the subject matter of Example 37 may optionally include the determining means being for determining whether the radio cell supports simultaneous operation in a plurality of different and overlapping frequency bands based on system information transmitted by the radio cell.

In Example 39, the subject matter of Example 37 may optionally include the determining means being for determining whether the radio cell supports simultaneous operation in a plurality of different and overlapping frequency bands based on system information transmitted by the radio cell and received by the communication terminal when the radio cell is serving the communication terminal.

In Example 40, the subject matter of Example 37 may optionally include the determining means being for determining whether the radio cell supports simultaneous operation in a plurality of different and overlapping frequency bands based on system information transmitted by a neighboring radio cell of the radio cell.

In Example 41, the subject matter of Example 37 may optionally include the determining means being for determining whether the radio cell supports simultaneous operation in a plurality of different and overlapping frequency bands based on system information transmitted by a neighboring radio cell of the radio cell and received by the communication terminal when the neighboring radio cell is a serving cell of the communication terminal.

In Example 42, the subject matter of Example 36 may optionally include the controlling means being for determining for a candidate radio cell for a cell reselection whether an information specifying whether the radio cell supports simultaneous operation in a plurality of different and overlapping frequency bands is stored by the storing means, and, if the information is stored by the storing means, for initiating a cell reselection to one of the plurality of radio cells based on at least a part of the information.

In Example 43, the subject matter of Example 36 may optionally include the cell reselection being a change from a current serving cell of the communication terminal to the radio cell as new serving cell of the communication terminal.

In Example 44, the subject matter of Example 36 may optionally include the plurality of radio cells belonging to a first communication network and the controlling means being for initiating a cell reselection to one of the plurality of radio cells based on at least a part of the information when the communication terminal is being served by a radio cell of a second communication network.

In Example 45, the subject matter of Example 44 may optionally include the first communication network and the second communication network operating according to different mobile radio communication standards.

In Example 46, the subject matter of Example 45 may optionally include the first communication network being an LTE communication network and the second communication network being a GERAN communication network.

In Example 47, the subject matter of Example 44 may optionally include the storing means being for storing the information for each radio cell in association with a radio cell of the second communication network.

In Example 48, the subject matter of Example 47 may optionally include the controlling means being for determining, when a radio cell of the second communication network is serving the communication terminal, for a candidate radio cell for a cell reselection which belongs to the first communication network whether an information specifying whether the radio cell supports simultaneous operation in a plurality of different and overlapping frequency bands is stored by the storing means by checking the information stored by the storing means in association with the radio cell of the second communication network serving the communication terminal.

In Example 49, the subject matter of Example 36 may optionally include the storing means being for storing the information for each radio cell in association with another radio cell in the vicinity of the radio cell and the controlling means being for determining for a radio cell of the plurality of radio cells whether an information specifying whether the radio cell supports simultaneous operation in a plurality of different and overlapping frequency bands is stored by the storing means by checking the information stored by the storing means in association with radio cells in the vicinity of the communication terminal.

In Example 50, the subject matter of Example 44 may optionally include the radio cell of the second communication network and the radio cells of the plurality of radio cells being neighboring radio cells.

In Example 51, the subject matter of Example 36 may optionally include the information specifies whether the radio cell supports simultaneous serving of mobile terminals operating in different frequency bands.

In Example 52, the subject matter of Example 36 may optionally include the information specifying whether the radio cell supports Multiple Frequency Band Indicator.

It should be noted that one or more of the features of any of the examples above may be combined with any one of the other examples.

In the following, examples are described in more detail.

GERAN aspects for dealing with UTRAN and E-UTRAN MFBI are still under discussion in the 3GPP TSG GERAN. Currently, the signaling and UE behavior in connected mode is defined and the working assumption is that in idle mode a UE centric approach is sufficient. 3GPP TSG GERAN has made the working assumption that air interface signaling for communicating MFBI information for UTRAN and E-UTRAN neighbor cells in (packet) idle mode will not be introduced. Due to this, in idle mode, the UE cannot learn whether an inter-RAT neighbor is supporting MFBI or not. The UE is only aware of the band indicated by the EARFCN (or UARFCN) used to refer to it in System Information messages. The TSG GERAN's assumption is that in idle mode, a UE centric approach with no network assistance is sufficient to perform inter-RAT mobility.

A UE supporting MFBI may be defined as a UE that understands EARFCN encoding belonging to bands that are not supported by the UE and also understands whether the physical frequencies referred to by these EARFCNs overlap with an EARFCN from another band. For example, in the case of Band 12 and band 17, a UE supporting only Band 12 still understands a cell with EARFCN 5730 (Band17) as a physical frequency of 734 MHz which refers to EARFCN 5060 of Band 12 which the UE supports. A UE not supporting MFBI only understands UARFCN/EARFCN encoding of supported bands.

A UTRAN or E-UTRAN cell supporting MFBI broadcasts information specifying that it supports additional bands other than the one indicated in legacy signaling which the physical frequency used by the cell belongs to. In the example above, the cell may indicate Band 17 in legacy signaling and broadcast that it supports Band 12 in the list of supported multiple bands. Such a cell can provide service to a UE supporting Band 12 or Band 17.

Table 1 summarizes the four possible combinations of a support of MFBI by UE and a cell.

TABLE 1

| UTRAN or E-UTRAN Cell | UE | |
|---|---|---|
| | Supports MFBI | Does not support MFBI |
| Supports MFBI | No issue | Misses the reselection candidate |
| Does not support MFBI | Attempts to reselect and fails since SIB1 indicates a non-supported band and no multi-band capabilities | No issue |

The case of a UE supporting MFBI evaluating a cell that does not support MFBI is currently not addressed by 3GPP for Inter-RAT reselections from a GERAN cell but is left open for UE implementation. An example for such a scenario is described in the following with reference to FIG. 4.

Figure 4:
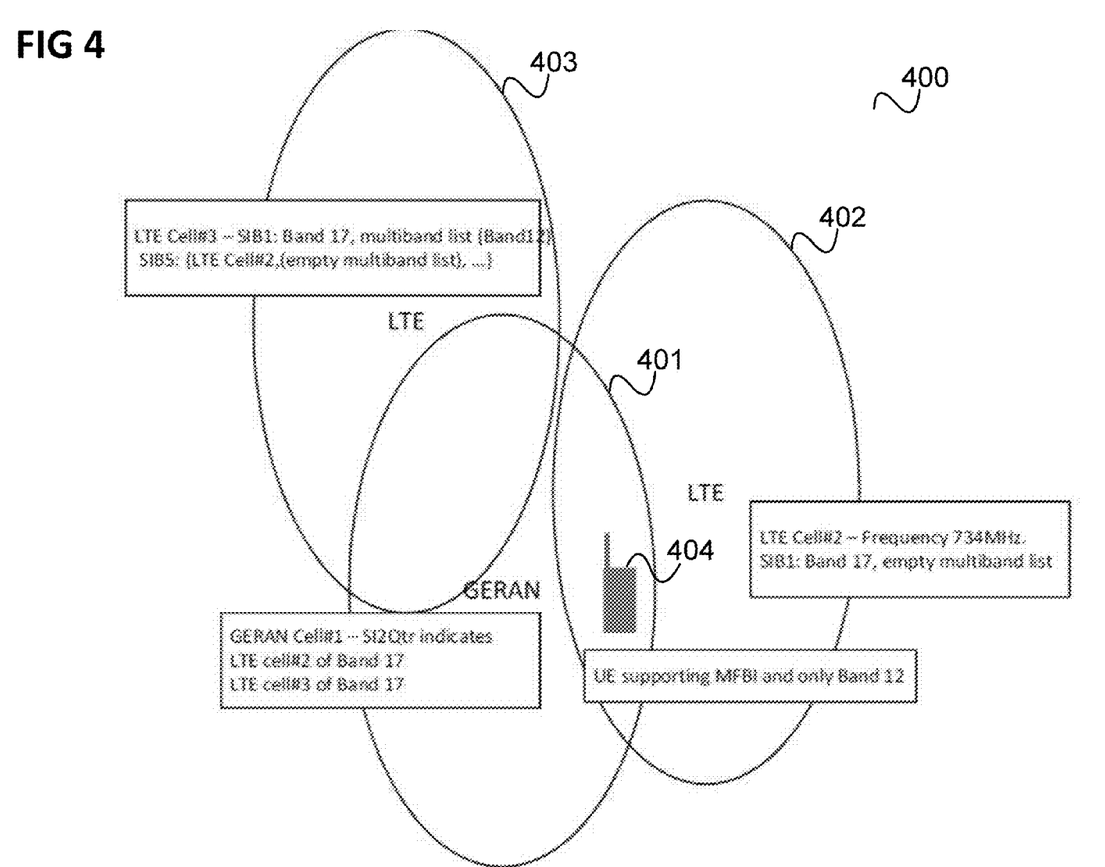
FIG. 4 shows a communication arrangement including GERAN and LTE cells.

FIG. 4 shows a communication arrangement 400.

The communication arrangement 400 comprises a GERAN cell 401 which is referred to as Cell#1.

The GERAN cell 401 has a neighboring first LTE cell 402 which is referred to as Cell#2 and which is operated at Frequency 734. The first LTE cell 402 does not support MFBI and broadcasts in SIB1 only Band 17 as supported band. The GERAN cell 401 has a neighboring second LTE cell 403 which is referred to as Cell #3 which supports MFBI. The SI2Qtr (System Information-2 Quarter) in the GERAN cell 401 uses band 17 EARFCN for the LTE cells 402, 403. A UE 404 which is located in the overlapping region of the GERAN cell 401 and the first LTE cell 402 that supports MFBI and supports only Band 12 can read this Band 17 EARFCN of the first LTE cell 402 and understand it to be a potential candidate cell. However, in the absence of MFBI information about the LTE cells 402, 403 in GERAN system information, the UE 404 is not signaled in this scenario that the first LTE cell 402 does not support MFBI. Thus, the UE 404 may attempt a reselection (because the alternative is the risk of missing a reselection candidate) and find that the first LTE cell 402 not suitable since the SIB1 in the first LTE cell 402 only broadcasts Band 17 as supported band and must therefore not be used by the UE 404 which only supports Band 12.

With the behavior defined by the standard, the UE 404 only learns that the first LTE cell 402 does not support MFBI when it attempts a reselection to the first LTE cell 402. This however leads to a failed reselection and possible service interruption. A service interruption is typically a significant issue in such a scenario since a reselection from a GERAN cell to an UTRAN or E-UTRAN cell is likely to be a transition towards a higher priority cell (i.e. the GERAN cell is still under good radio conditions and a UE which can potentially avoid this reselection attempt will still be able to receive paging in the GERAN cell). Also the power consumption for measuring such a non-suitable cell is to be considered.

To avoid this, the UE 404 may apply a learn-as-you-go approach or an active acquisition of a neighbor cell SIB1. However, a learn-as-you-go approach still requires one reselection attempt per UTRAN/EUTRAN candidate cell to collect the information about whether a cell supports MFBI or not and active acquisition incurs additional power consumption.

In view of this, in the example described in the following, to further avoid reselection attempts and measurement on non-suitable neighbor cells the UE 404 builds up a database in its memory about which cells support MFBI and which do not from system information it receives when being served by a UTRAN or an E-UTRAN cell.

The system information blocks in a UTRAN and E-UTRAN cell transmit the multiband capability for Inter-Frequency and Inter-RAT neighbor cells. In UTRAN, this is available in SIB11, 11bis and 12 for UTRAN neighbors and SIB19 for E-UTRAN neighbors. In E-UTRAN, SIB5 gives multiband info about E-UTRAN neighbors and SIB6 for UTRAN neighbors. In a typical environment, it can be assumed that a UE at power-on would camp on either an E-UTRAN or a UTRAN cell due to preference settings in the UE. A reselection to a GERAN cell typically happens due to falling out of coverage of the UTRAN or E-UTRAN cells or due to procedures like CSFB (Circuit Switched Fallback). Hence, in most of the cases a UE can acquire SIBs from one or more UTRAN or E-UTRAN cells before reselecting to a GERAN cell. If a UE moves from a UTRAN or an E-UTRAN cell to a GERAN cell, it can be assumed that reverse mobility is also likely.

For example, the memory of the UE 404 may contain a two-dimensional network mapping database updated at every Inter-RAT reselection by the UE 404 to and from a GERAN radio cell. At a reselection from a UTRAN or E-UTRAN (source) cell to a GERAN (target) cell, the UE stores the multiband information for inter-frequency neighboring cells and inter-RAT neighboring cells obtained from the source cell's System Information Blocks (SIB) tagged with the target cell's Cell Global Identity (CGI, e.g. comprising PLMN (Public Land Mobile Network) ID, Location Area Code and Cell ID) which uniquely identifies a cell within an operators' network). Similarly, at a successful reselection from a GERAN (source) cell to a UTRAN or E-UTRAN (target) cell the source cell's CGI and multiband info from the target cell's SIBs are stored. If, for example, an entry for the GERAN CGI already exists, the UE 404 may overwrite the existing information with the latest acquired information. The UE 404 can use this database as a reference when evaluating reselection from a GERAN cell to a UTRAN or E-UTRAN cell.

For example, a two-dimensional network mapping database has a structure as shown in table 2.

TABLE 2

| 2G CGI #1 | UTRAN neighbor cell 1 (Band as per legacy signaling) | Multiband list |
| --- | --- | --- |
| | E-UTRAN neighbor cell 1 (Band as per legacy signaling) | Multiband list |
| | E-UTRAN neighbor cell 2 (Band as per legacy signaling) | Multiband list |
| 2G CGI #2 | UTRAN neighbor cell 1 (Band as per legacy signaling) | Empty Multiband list |
| 2G CGI #3 | E-UTRAN neighbor cell 2 (Band as per legacy signaling) | Multiband list |

The two-dimensionality of the list lies in that for each GERAN cell (identified by its CGI in the left column) there exists a list of neighboring UTRAN and E-UTRAN cells (each with its multiband list, in case it supports MFBI).

Storing this level of information in the network mapping database ensures that the UE has the knowledge not only about UTRAN and E-UTRAN cells it has earlier camped on but also about their neighbors.

In the scenario of FIG. 4, assuming the UE 404 was in the second LTE Cell 403 before moving to the GERAN cell 401, it would have an entry in its network mapping database for the first LTE cell 402 and could have thus prevented measuring or reselecting to the first LTE cell 402. For example, the database stored in its memory contains an entry as in table 3.

TABLE 3

| GERAN Cell #1 | LTE Cell #3, Band 17 | Multiband list: Band 12 |
| --- | --- | --- |
| | LTE Cell #2, Band 17 | empty Multiband list |

When evaluating a reselection from a GERAN Cell, a UE checks in its database whether the target cell is broadcasting a multiband list and whether the cell supports the band the UE supports. For example, using its database, the UE 404 in the GERAN cell 401 can decide that the first LTE cell 402 is not suitable and can even skip measurements on this neighbor cell.

In case that the GERAN cell from where the UE is evaluating reselection (i.e. its current serving cell) is not present in the database the UE can for example rely on information from other GERAN cells in the same Location Area (LAC) as its serving cell, if that is available.

Though it might be good for the UE to keep collecting as much information as about MFBI support as possible, there typically will be a practical limit to the list (i.e. database) size. The UE may for example take this into account by deleting the least used entry of the database. For this, a counter may be defined for each entry in the database and the UE increments the counter each time an entry was used to verify (evaluate) a candidate cell. If a new entry has to be added, the UE removes the entry with the lowest counter value.

The database allows reducing the number of attempted/failed reselections from GERAN cells to UTRAN and E-UTRAN cells and avoiding waste of power consumption by measuring frequencies supported by the UE. The UE may build up the database using information it collects as part of its normal procedures such that no additional power consuming actions are required from the UE to create and maintain the database.

It should be noted that information in the database may become stale. For example, in a scenario where a cell which was not previously supporting MFBI starts to support MFBI, then relying on the database may cause UE to miss a reselection candidate. A UE may address this by attempting a reselection to such a cell under certain conditions, e.g. if no other high priority layers are configured or found during three consecutive searches.

Typically a multi-RAT UE attempts to camp on a UTRAN or a E-UTRAN cell first as per the UE configuration. So a case of a blank database at the first GERAN to UTRAN or E-UTRAN reselection is unlikely. To address the case of a blank database (when camping on a GERAN cell first time in the PLMN), the UE can actively acquire SIBs from a neighbor UTRAN, E-UTRAN cell.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal in a served connection with a first network access node configured to a first radio access technology (RAT), the communication terminal comprising:
    a storage element to store information associated with a second network access node configured to a second RAT different from the first RAT, the stored information associated with the second network access node indicating whether the second network access node supports operation in a plurality of different frequency bands overlapping in bandwidth;
    a receiver configured to receive, from the second network access node, information indicating whether the second network access node supports operation in a plurality of different frequency bands overlapping in bandwidth; and
    processing circuitry configured to:
        initiate a cell reselection from the first network access node to the second network access node based on the stored information associated with the second network access node, and
        update, at the cell reselection from the first network access node to the second network access node, the stored information associated with the second network access node with the received information from the second network access node.

2. The communication terminal of claim 1,
wherein the storage element is configured to store, prior to establishing the served connection with the first network access node, the information associated with the second network access node indicating whether the second network access node supports simultaneous operation in a plurality of different frequency bands overlapping in bandwidth, and
the processing circuitry is further configured to determine whether the second network access node supports simultaneous operation in a plurality of different frequency bands overlapping in bandwidth based on the stored information associated with the second network access node.

3. The communication terminal of claim 2,
wherein the storage element stores, prior to establishing the served connection with the first network access node, the information associated with the second network access node as being further associated with the first network access node, and
the processing circuitry is configured to determine whether the second network access node supports simultaneous operation in a plurality of different frequency bands overlapping in bandwidth by checking the stored information associated with the first network access node.

4. The communication terminal of claim 1,
wherein the receiver is further configured to receive system information including the information indicating whether the second network access node supports simultaneous operation in a plurality of different frequency bands overlapping in bandwidth.

5. The communication terminal of claim 4,
wherein the receiver is configured to receive the system information from the second network access node when the communication terminal is served by the second network access node.

6. The communication terminal of claim 4,
wherein the receiver is configured to receive the system information from a third network access node configured to a third RAT, and
the second network access node is connected to the third network access node by a communication interface.

7. The communication terminal of claim 6,
wherein the receiver is configured to receive the system information from the third network access node when the communication terminal is served by the third network access node.

8. The communication terminal of claim 7,
wherein the system information received from the third network access node includes information associated with the third network access node, the information associated with the third network access node indicating whether the third network access node supports simultaneous operation in a plurality of different frequency bands overlapping in bandwidth, and
the storage element is configured to store, prior to establishing the served connection with the first network access node, the information associated with the third network access node.

9. The communication terminal of claim 8,
wherein the processing circuitry is further configured to initiate a cell reselection from the first network access node to the third network access node based on the stored information associated with the third network access node.

10. The communication terminal of claim 6,
wherein the storage element stores, prior to establishing the served connection with the first network access node, the information associated with the second network access node as being further associated with the third network access node,
the processing circuitry is further configured to determine whether the second network access node supports simultaneous operation in a plurality of different frequency bands overlapping in bandwidth by checking the stored information associated with the third network access node, and
the first network access node is connected to the third network access node by a communication interface.

11. The communication terminal of claim 1,
wherein the first RAT and the second RAT are different mobile radio communication standards.

12. The communication terminal of claim 11,
wherein the first RAT is Global System for Mobile Communications (GSM)-Enhanced Data Rates for Global Evolution (EDGE) and the second RAT is Long Term Evolution (LTE).

13. The communication terminal of claim 1,
wherein the stored information associated with the second network access node indicates whether the second network access node is configured to simultaneously serve communication terminals operating in a plurality of different frequency bands overlapping in bandwidth.

14. The communication terminal of claim 1,
wherein the stored information associated with the second network access node indicates whether the second network access node supports Multiple Frequency Band Indicator (MFBI).

15. The communication terminal of claim 1,
wherein the processing circuitry is configured to update the stored information associated with the second network access node at each inter-RAT cell reselection to or from the second network access node.

16. The communication terminal of claim 1,
wherein the processing circuitry is configured to limit updates of the stored information associated with the second network access node to network access nodes, which are configured to the second RAT.

17. The communication terminal of claim 1,
wherein the receiver is further configured to receive, from the second network access node, cellular identity information of the first network access node, and
the processing circuitry is further configured to update, at the cell reselection from the first network access node to the second network access node, the stored information associated with the second network access node to include the received cellular identity information of the first network access node from the second network access node.

18. A method for controlling a cell reselection by a communication terminal that has established a served connection with a first network access node configured to a first radio access technology (RAT), the method comprising:
storing, prior to establishing the served connection with the first network access node, information associated with a second network access node configured to a second RAT different from the first RAT, the stored information associated with the second network access node indicating whether the second network access node supports simultaneous operation in a plurality of different frequency bands overlapping in bandwidth;
receiving, from the second network access node, information indicating whether the second network access node supports simultaneous operation in a plurality of different frequency bands overlapping in bandwidth;
initiating a cell reselection from the first network access node to the second network access node based on the stored information associated with the second network access node; and
updating, at the cell reselection from the first network access node to the second network access node, the stored information associated with the second network access node with the received information from the second network access node.

19. The method of claim 18, further comprising:
determining whether the second network access node supports simultaneous operation in a plurality of different frequency bands overlapping in bandwidth, based the stored information associated with the second network access node.

20. A non-transitory computer readable medium for controlling a cell reselection by a communication terminal that has established a served connection with a first network access node configured to a first radio access technology (RAT), the non-transitory computer readable medium having instructions stored thereon which, when executed by a processor, cause the processor to:
store, prior to establishing the served connection with the first network access node, information associated with a second network access node configured to a second RAT different from the first RAT, the stored information associated with the second network access node indicating whether the second network supports simultaneous operation in a plurality of different frequency bands overlapping in bandwidth;
receive, from the first second network access node, information indicating whether the second network access node supports simultaneous operation in a plurality of different frequency bands overlapping in bandwidth;
initiate a cell reselection from the first network access node to the second network access node based on the stored information associated with the second network access node; and
updating, at the cell reselection from the first network access node to the second network access node, the stored information associated with the second network access node with the received information from the second network access node.

\* \* \* \* \*

UNITED STATES PATENT AND TRADEMARK OFFICE
CERTIFICATE OF CORRECTION

PATENT NO. : 9,930,588 B2
APPLICATION NO. : 14/459379
DATED : March 27, 2018
INVENTOR(S) : Sudeep Manithara Vamanan It is certified that error appears in the above-identified patent and that said Letters Patent is hereby corrected as shown below:

In the Claims

Column 16, Line 47:
Please delete "first" between the words "the" and "second"

Signed and Sealed this
Twenty-ninth Day of May, 2018

Andrei Iancu
*Director of the United States Patent and Trademark Office*